United States Patent [19]
Rottenkolber

[11] Patent Number: 5,760,888
[45] Date of Patent: Jun. 2, 1998

[54] OBJECT TO HAVING A IMAGE PROCESSING FOR DETERMINING THE STRUCTURAL OF A TEST OBJECT WITH A DIFFUSE-SCATTERING SURFACE

[75] Inventor: Hans Rottenkolber, Amerang, Germany

[73] Assignee: NOVA C.O.R.D. AG, Liechtenstein

[21] Appl. No.: 704,663

[22] PCT Filed: Jan. 15, 1996

[86] PCT No.: PCT/EP96/00187

§ 371 Date: Sep. 13, 1996

§ 102(e) Date: Sep. 13, 1996

[87] PCT Pub. No.: WO96/22507

PCT Pub. Date: Jul. 25, 1996

[30] Foreign Application Priority Data

Jan. 16, 1995 [DE] Germany ............... 195 01 073.6

[51] Int. Cl.$^6$ ........................................... G01L 1/24
[52] U.S. Cl. ........................................... 356/35.5
[58] Field of Search ........................... 356/35.5, 353

[56] References Cited

U.S. PATENT DOCUMENTS

| | | | |
|---|---|---|---|
| 4,591,996 | 5/1986 | Vachon | 356/35.5 |
| 5,011,280 | 4/1991 | Hung | 356/35.5 |
| 5,020,904 | 6/1991 | McMahan, Jr. | 356/35.5 |
| 5,065,331 | 11/1991 | Vachon et al. | 356/35.5 |
| 5,091,776 | 2/1992 | Tyson, II | 356/35.5 |
| 5,146,289 | 9/1992 | Newman | 356/35.5 |
| 5,481,356 | 1/1996 | Pouet et al. | 356/35.5 |

FOREIGN PATENT DOCUMENTS 4231578  3/1994  Germany .

OTHER PUBLICATIONS

Spooren et al., "Electronic shear interferometry: application of a (double-) pulsed laser", *Applied Optics*, 32(25):4719-4727, Sep. 1, 1993.

Stetson, "Phase-step interferometry of irregular shapes by using an edge-following algorithm", *Applied Optics*, 31(25):5320-5325, Sep. 1, 1992.

Schnars, "Direct phase determination in hologram interferometry with use of digitally recorded holograms", *J. Opt. Soc. Amer.*, 11(7):2011-2015, Jul. 1994.

*Primary Examiner*—Frank G. Font
*Assistant Examiner*—Jason D. Vierra-Eisenberg
*Attorney, Agent, or Firm*—Rothwell, Figg, Ernst & Kurz, P.C.

[57] ABSTRACT

The proposed image-processing method for determining the structural strength of a test object with a diffuse-scattering surface involves: the creation of an interferogram based on radiation back-scattered by the surface of the test object; conversion of the intrerferogram into a modulo-2π image; and the stabilization of the modulo-2π image to form an output grey scale value image. From the later, an identical duplicate grey scale value image is produced; this is then geometrically shifted and modified by applying an invariable grey scale value in the entire image area, before being finally subtracted from the initial grey scale value image to produce a grey scale image containing easily evaluated information on deformities in the observed test object.

10 Claims, 6 Drawing Sheets

Typical structural weaknesses

① Belt edge (shoulder region)

② Integral effect of weak points in cross section in the side wall (flexing zone)

— BULGE
-- image shifted by ΔS (shearing)

— SHEARING IMAGE
-- shearing image shifted by ΔX

— GREY SCALE VALUE DISTRIBUTION after shearing and subtraction

— BULGE
-- Image shifted by ΔS (shearing)

— SHEARING IMAGE
-- Shearing image shifted by ΔX (geometrically)
ΔG (grey scale value)

resulting
— GREY SCALE VALUE DISTRIBUTION after
a) shearing ΔS
b) GSV shift ΔG
c) subtraction ΔX

DIRECTION DISCRIMINATION  ⊕

Legend see Sheet "....... ⊕"

Legend see Sheet "....... ⊕"

Legend see Sheet "....... ⊕"

DIRECTION DISCRIMINATION ⊙

FIG. 6A
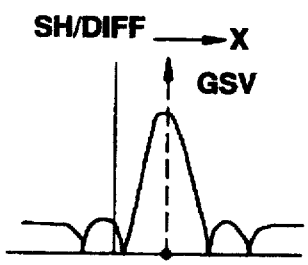
FIG. 6B
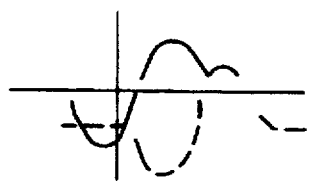
FIG. 6C
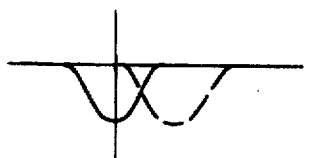
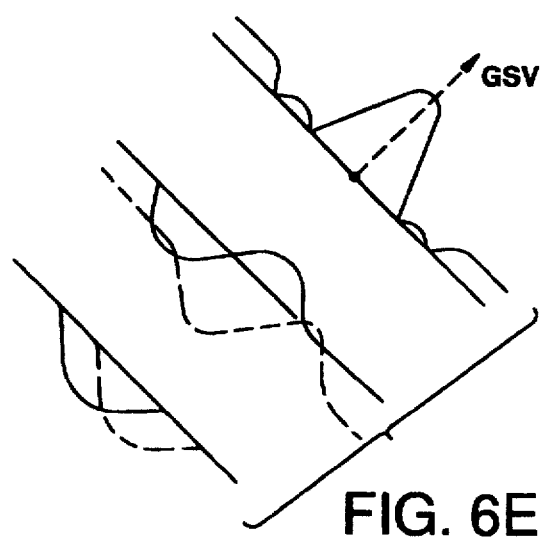
FIG. 6E
FIG. 6D
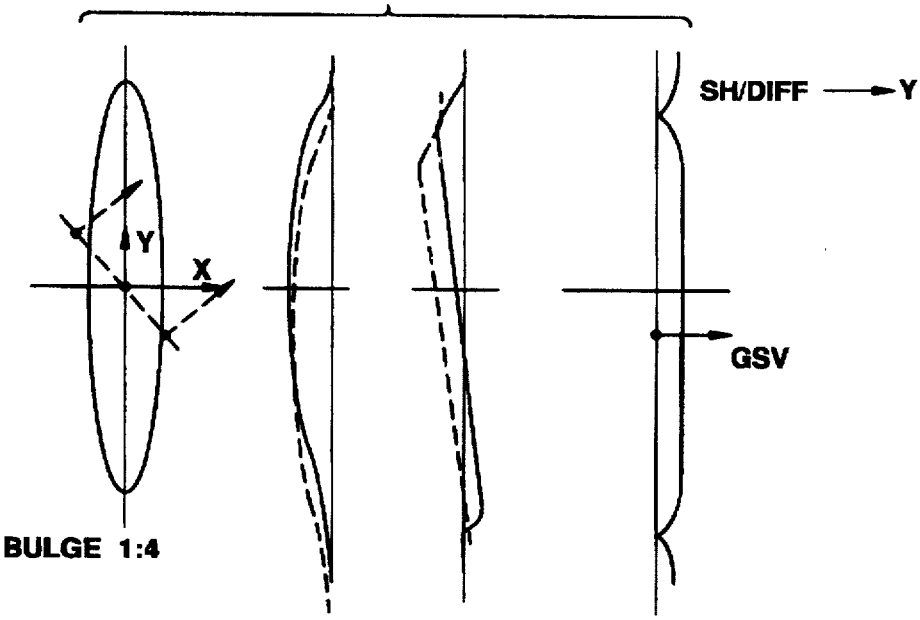
BULGE 1:4

Typical structural weaknesses

① Belt edge (shoulder region)

② Integral effect of weak points in cross section in the side wall (flexing zone)

OBJECT TO HAVING A IMAGE PROCESSING FOR DETERMINING THE STRUCTURAL OF A TEST OBJECT WITH A DIFFUSE-SCATTERING SURFACE

FIELD OF INVENTION

The invention relates to a method for determining the structural strength of a test object having a diffuse-scattering surface in accordance with the precharacterising clause of claim 1.

BACKGROUND OF THE INVENTION

A method according to the precharacterising clause is known from DE-OS 42 31 578 A1. In that method, a test object is irradiated with coherent light and the radiation scattered back from the test object is divided into two partial beams. The two partial beams are joined together again by shifting the two partial beams slightly (shearing effect). The partial beans carrying the image information are conveyed to an electronic image sensor system. The test object is imaged by the imaging component on the image sensor. The radiation impinging on the image sensor is converted into digital signals in accordance with an A/D conversion. The surface of the test object first of all has the state 1, and, after the application of deformation, the state 2. The surface state 1 is recorded by phase-shifting one partial beam in steps relative to the second partial beam in a first image sequence. The image sequence is typically stored in the temporary memory of a computer. A second image sequence is generated from the surface state 2 in the same manner. The individual steps of the first and second image sequences are further processed in a computer to form a modulo-$2\pi$ image. The aim of the deformation to be applied is always to recognise weak points as a result of the fact that such points have a significantly different deformation from that of the surrounding area. The image produced by this method is, on the one hand, the result of the constructional and geometrical form of the test object and, on the other hand, a consequence of structural irregularities. The disadvantage of this method is that the effect of structural irregularities can be recognised only when it is significantly greater than the effects caused by construction or geometry.

SUMMARY OF THE INVENTION

The object of the invention is further to develop the method known from DE-OS 42 31 578 A1 in such a manner that structural irregularities are distinguished in a simple manner from constructional and geometrical effects.

On the basis of the prior art according to the precharacterising clause, this problem is solved by the characterising features of claim 1. Advantageous embodiments of the method according to the invention form the subject-matter of claims 2 to 5.

The partial differentiation, carried out digitally and converted into a resulting grey scale value image, of a modulo-$2\pi$ image stabilised to form an initial grey scale value image enables structural irregularities to be differentiated from effects caused by construction or geometry because structural irregularities generally have larger gradients than do effects caused by construction or geometry. Owing to the fact that a further grey scale value shift of the second grey scale value image is carried out in the digital image processing method before the actual differentiation, it is even possible to recognise the gradient direction and consequently to classify the structural irregularity investigated as being of the concave or convex type.

An advantageous form of the method consists in illuminating the test object with coherent light from several laser diodes, each of which generates a light spot on the test object.

If in the case of a specific type of test object a typical structural irregularity occurs with an ellipse-like pattern and with a typical position arrangement, the method is advantageously carried out in such a manner that the shearing and differentiation direction coincides with the direction of the short semi-axis of the elliptically defined structural irregularity.

If in the case of a specific type of test object two typical structural irregularities occur with an ellipse-like pattern and with typical position arrangements at right-angles to one another, the direction that forms an angle of 45° with both short ellipse semi-axes is advantageously chosen as the shearing and differentiation direction.

It is advantageous to mark grey scale value ranges in the resulting grey scale value image by colours.

The method according to the invention has the advantage that structural irregularities in the resulting image stand out clearly from effects caused by construction or geometry and are therefore easy to identify. A further advantage of the method according to the invention resides in the fact that it is immediately possible to classify the structural irregularities as being of the concave or convex type.

Embodiments of the invention are described in more detail hereinafter with reference to drawings, in which:

BRIEF DESCRIPTION OF THE DRAWINGS

FIGS. 6a–e shows the effects of the shearing-differentiation direction on the grey scale value signal.

DETAILED DESCRIPTION OF THE INVENTION

In the method according to the invention, the modulo-$2\pi$ image obtained in the same manner as the modulo-$2\pi$ image of DE-OS 42 31 578 A1 is first converted into a grey scale value image in such a manner that the grey scale values of the individual image points indicate the difference in the deformation of two adjacent points on the test object. Development methods suitable for this purpose are described, for example, in "Digitale Verarbeitung und Auswertung von Interferenzbildern" (Digital processing and evaluation of interference patterns), Wolfgang Osten, Akademie-Verlag, Berlin, 1991, pages 138 to 144 and in "Proceedings of the I. International workshop on Automatic Processing of Fringe Patterns", Akademie-Verlag Berlin, 1989, pages 23 to 31.

The grey scale value distribution is determined by the difference in deformation in the shearing direction, the shearing direction being defined as the shift direction of one partial beam towards the other partial beam. Typical grey scale value distributions are shown in FIGS. 1 and 2.

Figure 1:
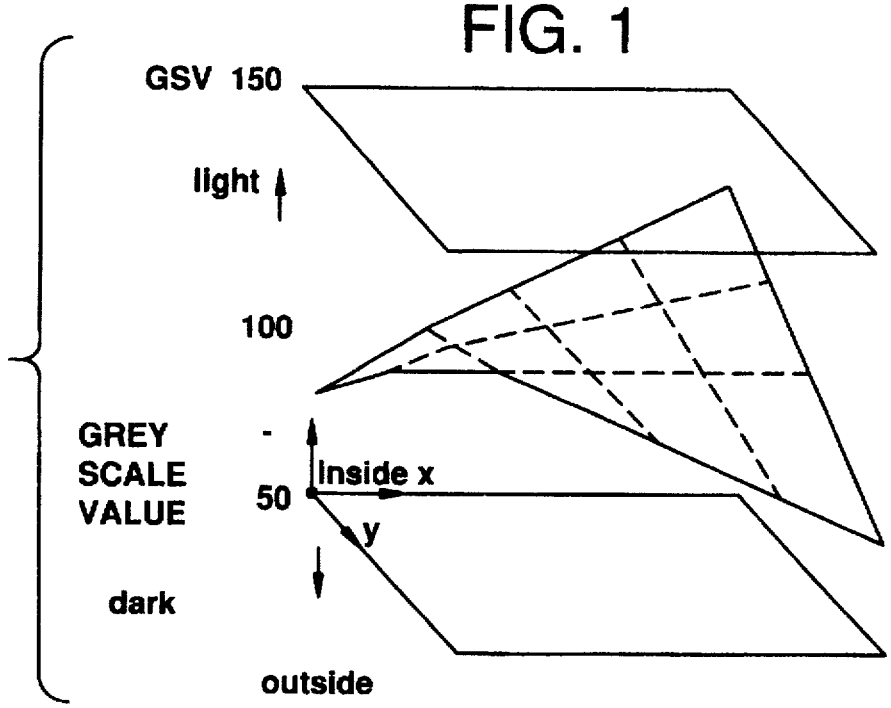
FIG. 1 shows the grey scale value distribution on the basis of the test geometry in the case of a tire (fall in internal pressure)
Figure 2:
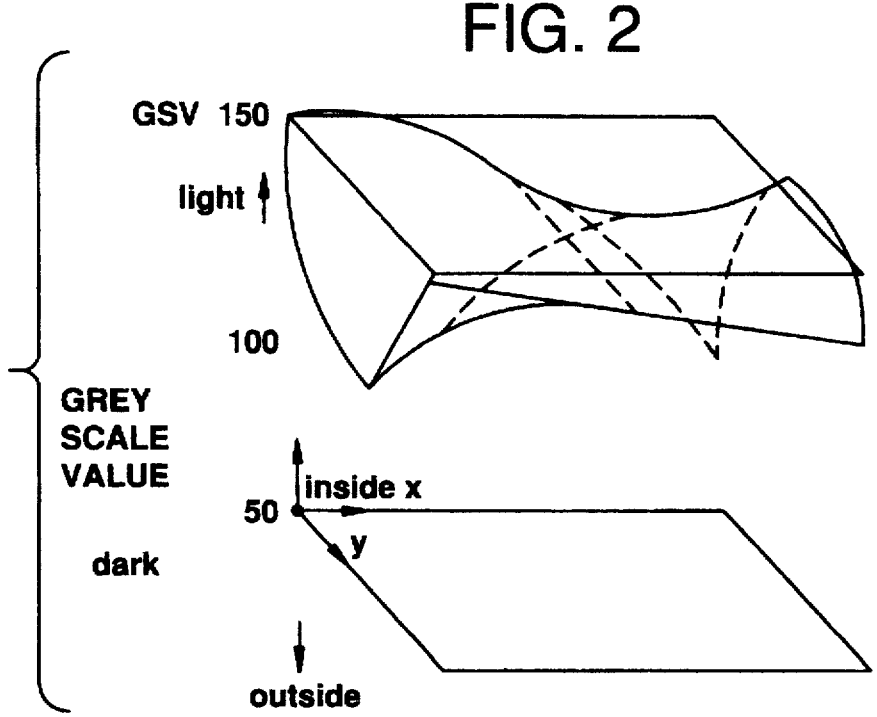
FIG. 2 shows the actual grey scale value distribution in the case of the effect of variable rigidity of the tire cross-section.

FIG. 1 shows, in the case of tangential shearing, the theoretical grey scale value distribution on the side wall of a homogeneous tire when there is a fall in pressure. FIG. 2 shows the grey scale value distribution actually measured. This pattern is determined basically by the constructional form of the tire cross-section. FIG. 2 shows that the effect of structural irregularities is recognised only if it is significantly greater than the effects caused by construction or geometry. The grey scale value image (that is to say, the difference in deformation) is, on the one hand, the result of the constructional and geometrical form of the test object and, on the other hand, a consequence of structural irregularities.

Figure 3A:
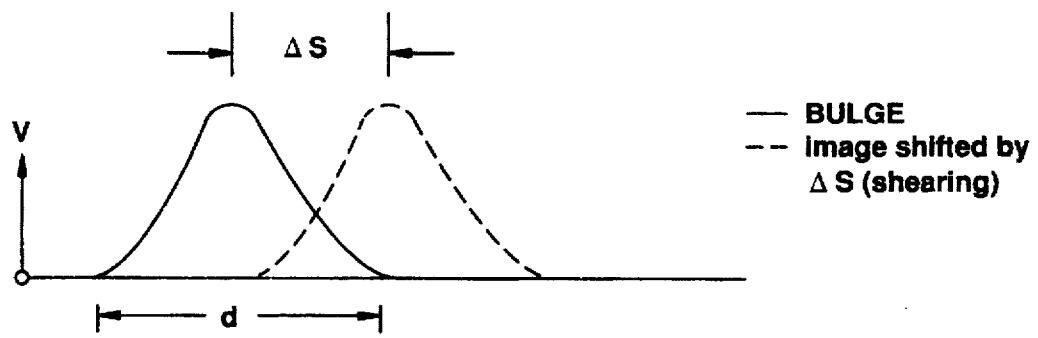
FIGS. 3a–c shows the method steps shearing-subtraction.
Figure 3B:
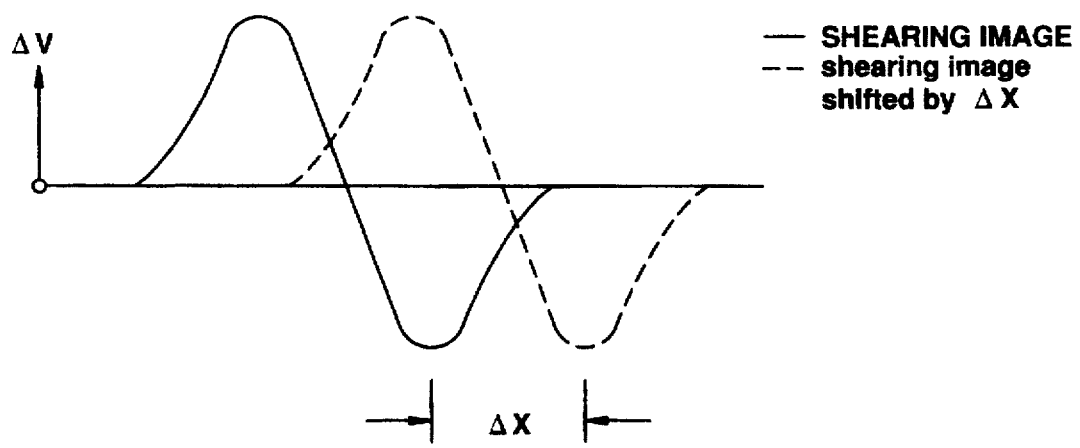
Figure 3C:
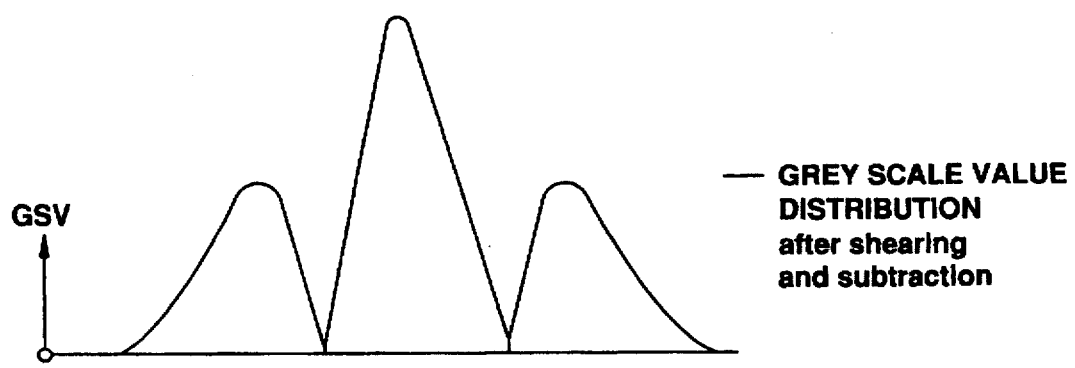

Since structural irregularities on test objects differ from effects caused by construction or geometry by a greater gradient, simple separation of the structural irregularities from the constructional and geometrical effects can be achieved by partial differentiation of the shearing image. The differentiation is effected approximately by subtracting two images which are shifted slightly towards one another. The two shifted images have the same initial image. The shearing direction is advantageously chosen as the shift direction ("partial differential"). FIG. 3 shows the principle of the individual stages of this procedure. The essence of the procedure resides in shifting the optically produced shearing image geometrically by the amount $\Delta x$ and superimposing it on the original image subtractively, as a result of which a corresponding grey scale value distribution is formed. By predetermining grey scale value thresholds, structural irregularities can be indicated in a simple manner. It is advantageous to mark grey scale value ranges by colours (for example green-yellow-red) which facilitates the good/bad decision considerably.

In many cases it is necessary to know the sign of the irregularity (for example concave or convex bulge). In the case of a tire, for example, a "jolt" brings about an increase in the local structural strength; however, it is structural weaknesses that are being sought. Differentiation is achieved only by recognising the sign of the deformation change when there is a change in pressure inside the tire.

Figure 4A:
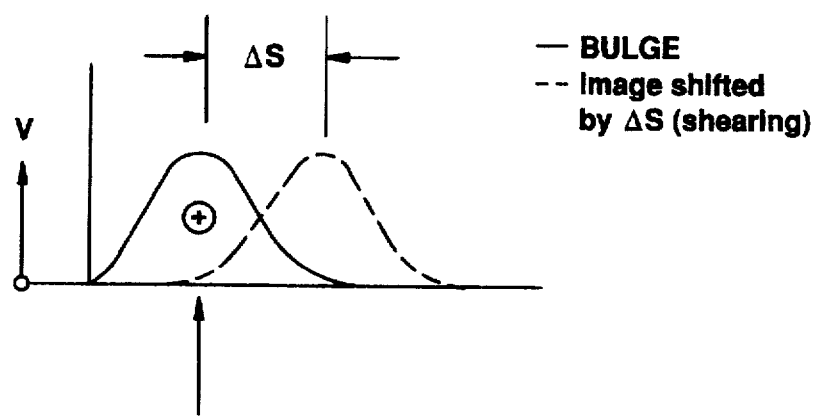
FIGS. 4a–c shows the effect of a convex deformation on the grey scale value distribution.
Figure 4B:
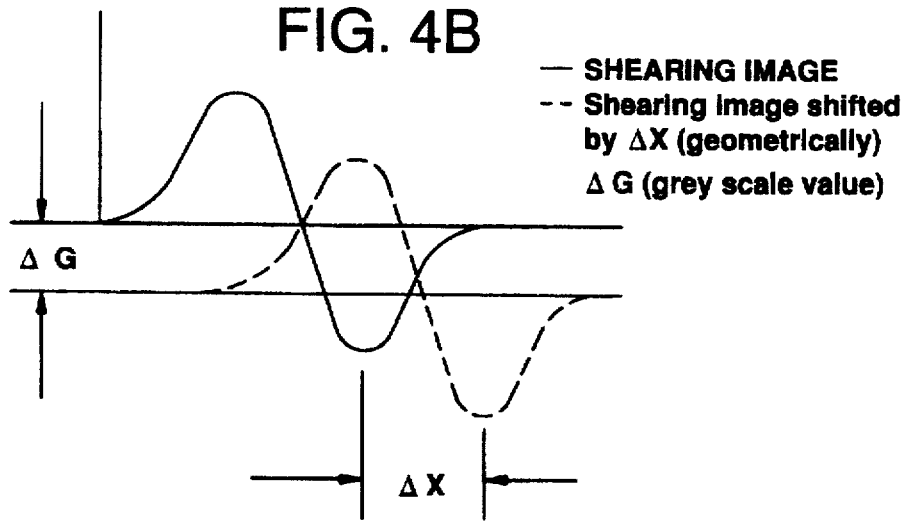
Figure 4C:
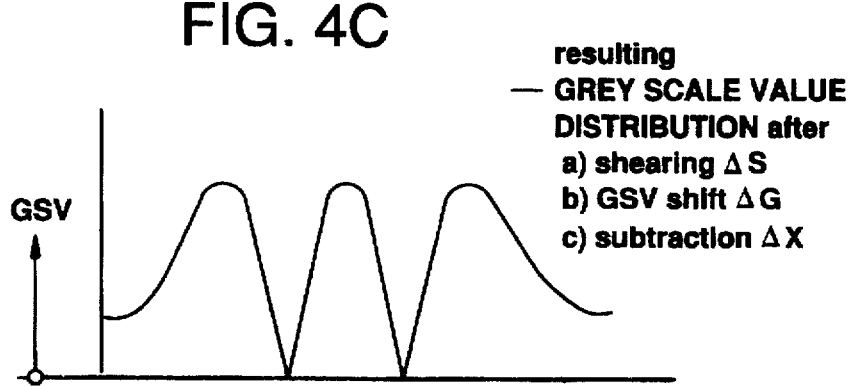
Figure 5A:
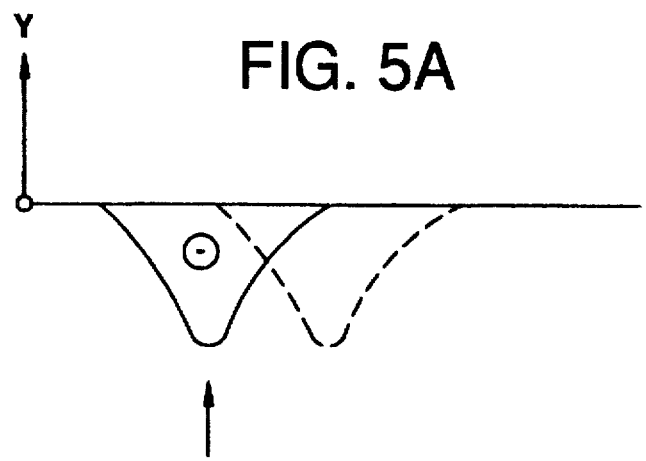
FIGS. 5a–c shows the effect of a concave deformation on the grey scale value distribution.
Figure 5B:
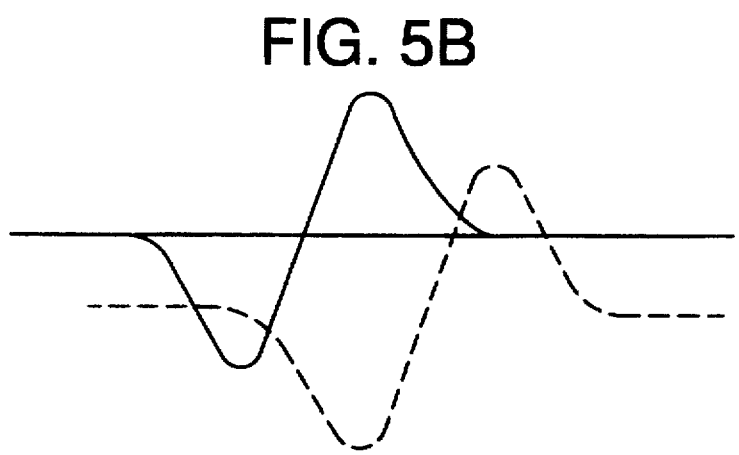
Figure 5C:
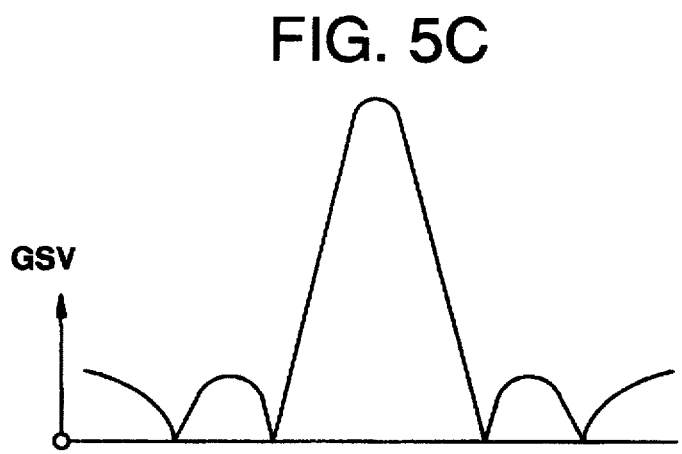

Recognition of the sign is made possible because the grey scale values of the shearing image, which is shifted geometrically for the purposes of subtraction, are also shifted. The resulting grey scale value distribution then differs significantly depending on the sign. This is shown in FIGS. 4 and 5.

If the test object has a complicated construction or geometry care must also be taken that the test range is so limited that structural irregularities in the grey scale value image remain significant.

In many cases, structural weaknesses are manifested in asymmetrical bulges or folds. The shearing direction, or the direction of subtraction, has a decisive influence on the definition of the signal caused by the bulges (folds). FIG. 6 shows this effect. With the chosen form of bulge, the shearing/difference direction x yields the best signal, good definition still being obtained under 45°, whereas the direction y exhibits no significance of the grey scale value image whatever.

Figure 7:
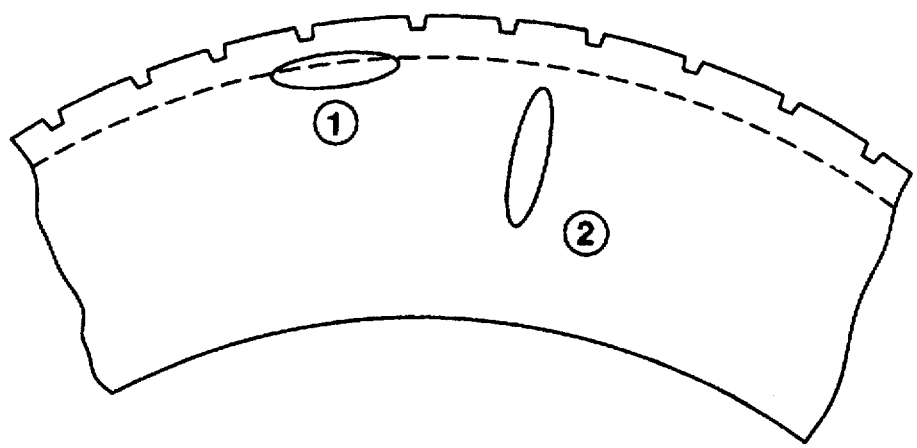
FIG. 7 shows typical structural weaknesses on a tire.

Typical structural weaknesses of a tire are shown in FIG. 7. The point marked "1" shows a belt edge separation, or the early stages of separation. It typically exhibits a tangential pattern, and the best indication is given by radial shearing/differentiation. Structural weaknesses over the tire cross-section are manifested in radially orientated folds (point "2"); the best indication is given by tangential shearing/differentiation. The 45°-direction is an acceptable compromise for both types of defect.

I claim:

1. Method for determining the structural strength of a test object having a diffuse-scattering surface, wherein the test object is illuminated with coherent light;

the radiation scattered back from the test object is divided into two partial beams in a double-beam interferometer;

in the double-beam interferometer, one of the two partial beams is shifted towards the other partial beam;

in the double-beam interferometer, one of the two partial beams is phase-shifted in steps;

the radiation scattered back from the test object and divided into two partial beams and joined together again in the double-beam interferometer is conveyed to an electronic image sensor system by components with a large aperture imaging the surface of the test object;

the signals emitted by the image sensor system are digitised and further processed in an image processing system to form a modulo-$2\pi$ image, and the modulo-$2\pi$ image is stabilised to form an initial grey scale value image, wherein the initial grey scale value image is partially differentiated in that a second grey scale value image identical with the initial grey scale value image is produced and is shifted geometrically towards the initial grey scale value image in the shearing direction and is changed by a grey scale value which is constant over the entire image range, and the second grey scale value image so manipulated is subtracted from the initial grey scale value image thus giving rise to a resulting grey scale value image.

2. Method according to claim 1, wherein the test object is illuminated with coherent light from several laser diodes, each of which generates a light spot on the test object.

3. Method according to claim 2 wherein for determining structural strength of a structural irregularity with an ellipse-like pattern, the direction of the short semi-axis of that elliptically defined structural irregularity is chosen as the shearing and differentiation direction.

4. Method according to claim 2, wherein for determining structural strength of two structural irregularities with an ellipse-like pattern and at right-angles to one another, the direction that forms and angle of 45° with each of the two short ellipse semi-axes is chosen as the shearing and differentiation direction.

5. Method according to claim 2, characterised in that grey scale value ranges are marked by colors in the resulting grey scale value image.

6. Method according to claim 1, wherein for determining structural strength of a structural irregularity with an ellipse-like pattern the direction of the short semi-axis of that elliptically defined structural irregularity is chosen as the shearing and differentiation direction.

7. Method according to claim 6, characterised in that grey scale value ranges are marked by colors in the resulting grey scale value image.

8. Method according to claim 1, wherein for determining structural strength of two typical structural irregularities with an ellipse-like pattern and at right-angles to one another, the direction that forms an angle of 45° with each of the two short ellipse semi-axes is chosen as the shearing and differentiation direction.

9. Method according to claim 8, characterised in that grey scale value ranges are marked by colors in the resulting grey scale value image.

10. Method according to claim 1, wherein grey scale value ranges are marked by colors in the resulting grey scale value image.

* * * * *

UNITED STATES PATENT AND TRADEMARK OFFICE
CERTIFICATE OF CORRECTION

PATENT NO. : 5,760,888
DATED : June 2, 1998
INVENTOR(S) : Rottenkolber

It is certified that error appears in the above-identified patent and that said Letters Patent is hereby corrected as shown below:

Col. 1, and On the title page, change Item[54] to read "IMAGE PROCESSING METHOD FOR DETERMINING THE STRUCTURAL STRENGTH OF A TEST OBJECT HAVING A DIFFUSE-SCATTERING SURFACE Signed and Sealed this Ninth Day of February, 1999

Attest:

Attesting Officer

*Acting Commissioner of Patents and Trademarks*